US008754872B2

(12) United States Patent
Geiger et al.

(10) Patent No.: US 8,754,872 B2
(45) Date of Patent: Jun. 17, 2014

(54) CAPACITIVE TOUCH CONTROLS LOCKOUT

(75) Inventors: Avi R. Geiger, Seattle, WA (US); Andrew W. Hill, Redmond, WA (US); John David Schultz, Redmond, WA (US); Peter Kyriacou, Seattle, WA (US); Jan Raken, Seattle, WA (US); Duane Martin Evans, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 13/233,193

(22) Filed: Sep. 15, 2011

(65) Prior Publication Data
US 2013/0069903 A1 Mar. 21, 2013

(51) Int. Cl.
*G06F 3/045* (2006.01)
(52) U.S. Cl.
USPC ............................................ 345/174; 345/173
(58) Field of Classification Search
USPC ...................... 345/156–179; 178/18.01–18.09
See application file for complete search history.

(56) References Cited

U.S. PATENT DOCUMENTS

| 7,555,728 B2 | 6/2009 | Esaki et al. |
| 7,890,778 B2 | 2/2011 | Jobs et al. |
| 2006/0267958 A1 | 11/2006 | Kolmykov-Zotov et al. |
| 2007/0103447 A1 | 5/2007 | Varian et al. |
| 2008/0070648 A1* | 3/2008 | Kang et al. ................ 455/575.3 |
| 2008/0106518 A1 | 5/2008 | Orlassino |
| 2009/0051660 A1 | 2/2009 | Feland, III et al. |
| 2009/0061928 A1* | 3/2009 | Lee et al. ................... 455/556.1 |
| 2009/0197615 A1* | 8/2009 | Kim et al. ................... 455/456.1 |
| 2009/0244016 A1* | 10/2009 | Casparian et al. ........... 345/173 |
| 2010/0113101 A1* | 5/2010 | Tanada ......................... 455/566 |
| 2010/0141603 A1* | 6/2010 | Hotelling .................... 345/173 |
| 2010/0207894 A1 | 8/2010 | Tsuei |
| 2010/0302187 A1* | 12/2010 | Cinqualbre et al. ......... 345/173 |
| 2010/0315348 A1 | 12/2010 | Jellicoe et al. |
| 2011/0034219 A1 | 2/2011 | Filson et al. |
| 2011/0090169 A1 | 4/2011 | Karhiniemi |
| 2011/0148756 A1* | 6/2011 | Oross et al. ................. 345/157 |
| 2011/0167375 A1* | 7/2011 | Kocienda .................... 715/773 |

OTHER PUBLICATIONS

"Dispersive Signal Touch Technology", Retrieved at <<http://www.palas-india.com/pdf/DST_Application_Brief.pdf>>, Retrieved Date: Jun. 24, 2011, pp. 1-4.

* cited by examiner

*Primary Examiner* — Premal Patel
(74) *Attorney, Agent, or Firm* — Jeremy Snodgrass; Glen Johnson; Micky Minhas

(57) ABSTRACT

In embodiments of capacitive touch controls lockout, a computing device includes a touch-screen display for user interaction, and includes one or more capacitive touch controls for user selection as a device input to initiate a device action. The computing device also includes a lockout service that is implemented to disable one or more of the capacitive touch controls based on user interaction with the touch-screen display.

19 Claims, 3 Drawing Sheets

CAPACITIVE TOUCH CONTROLS LOCKOUT

BACKGROUND

Various types of computing and media devices, such as tablet and portable computers, cell-phones, navigation devices, and desktop display devices include a touch-screen display for user input and touch interaction. Devices with an integrated touch-screen display may also have capacitive buttons or other selectable touch controls at the edges of the touch-screen display. These buttons and touch controls are prone to inadvertent actuation, such as when a user brushes up against a button or touch control while interacting with the touch-screen display on a device. A typical solution is to require the user to press and hold these types of capacitive buttons for a longer duration before an intended action is initiated. However, these types of delays appear to a user as a slow response and may be perceived as a negative user experience. Further, a capacitive button or touch control that is designed for press and hold actuation is not immune to a user inadvertently resting a hand or arm over the control, and initiating an unwanted action on the device.

SUMMARY

This Summary introduces simplified concepts of capacitive touch controls lockout, and the concepts are further described below in the Detailed Description and/or shown in the Figures. This Summary should not be considered to describe essential features of the claimed subject matter, nor used to determine or limit the scope of the claimed subject matter.

Capacitive touch controls lockout is described. In embodiments, a computing device includes a touch-screen display for user interaction, and includes one or more capacitive touch controls for user selection as a device input to initiate a device action. The computing device also includes a lockout service that is implemented to disable one or more of the capacitive touch controls based on user interaction with the touch-screen display.

In other embodiments, the lockout service is implemented to receive a service input of the user interaction based on any one or combination of: a user input to the touch-screen display; a user input on the touch-screen display adjacent a capacitive touch control; a user slide input direction of approach towards a capacitive touch control; and coordinated multiple user inputs on the touch-screen display. The lockout service may also be implemented to re-enable one or more of the capacitive touch controls after a duration of time and no additional user interaction with the touch-screen display; disable a capacitive touch control for a variable duration of time based on a position of user interaction with the touch-screen display; disable one or more of the capacitive touch controls for a duration of time, after which the capacitive touch controls re-enable without input from the lockout service; disable a first capacitive touch control based on a user input to select a second capacitive touch control; initiate active user feedback to indicate that a capacitive touch control has been disabled; and/or receive an override input to re-enable a capacitive touch control that has been disabled, such as when a user selects and holds a capacitive touch control for a duration of time.

BRIEF DESCRIPTION OF THE DRAWINGS

Embodiments of capacitive touch controls lockout are described with reference to the following Figures. The same numbers may be used throughout to reference like features and components that are shown in the Figures.

DETAILED DESCRIPTION

Embodiments of capacitive touch controls lockout are described. As noted above, capacitive touch controls at the edges of a touch-screen display are prone to inadvertent actuation by a user while interacting with the touch-screen display on a computing device. In embodiments, a lockout service is implemented to disable one or more of the capacitive touch controls on a device based on user interaction with a touch-screen display of the device to avoid inadvertent actuation by the user. The responsiveness of the capacitive touch controls is maintained while still filtering for inadvertent actuation.

While features and concepts of capacitive touch controls lockout can be implemented in any number of different devices, systems, and/or configurations, embodiments of capacitive touch controls lockout are described in the context of the following example devices, systems, and methods.

Figure 1:
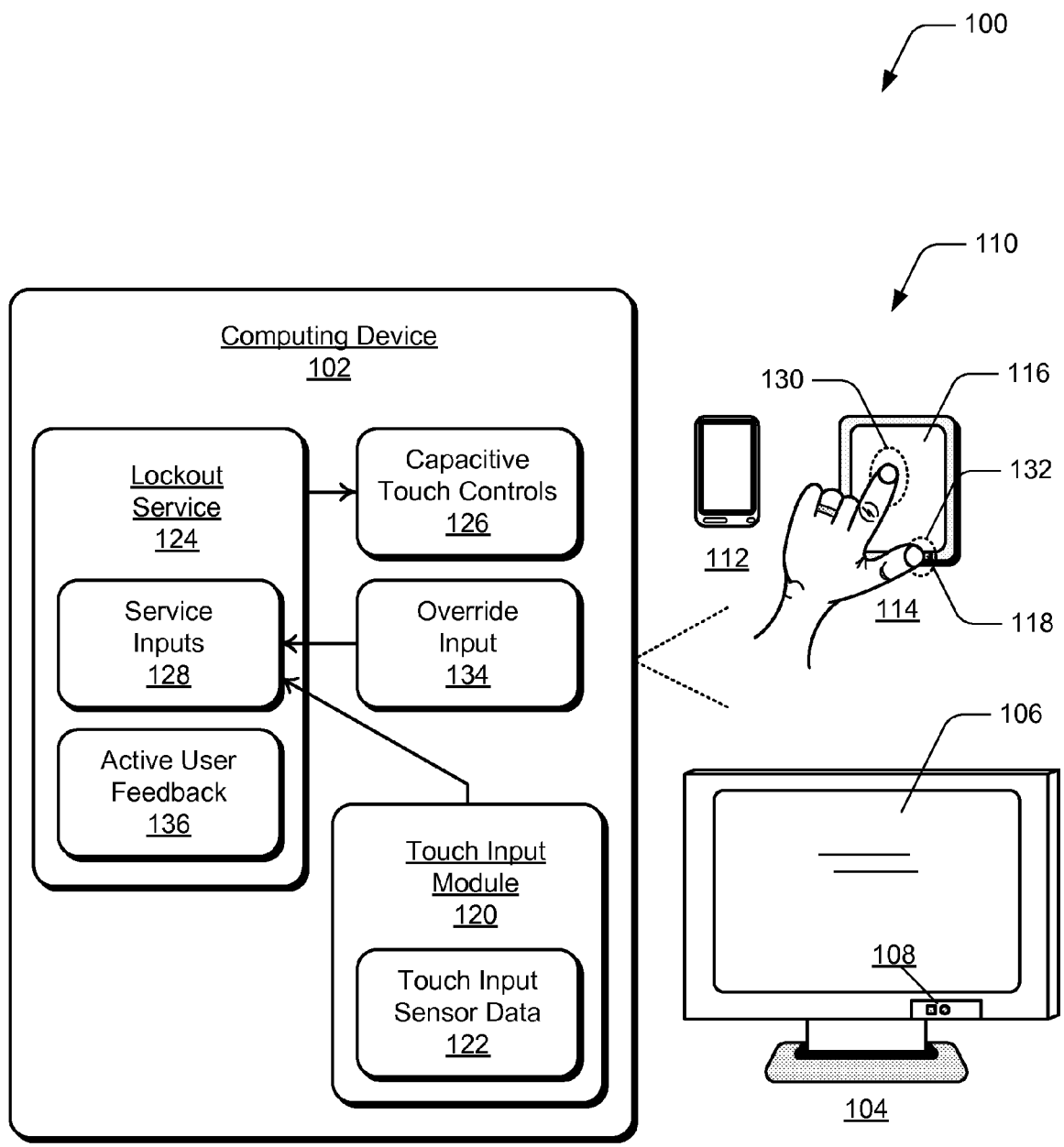
FIG. 1 illustrates examples of capacitive touch controls lockout in accordance with one or more embodiments.

FIG. 1 illustrates an example system 100 in which embodiments of capacitive touch controls lockout can be implemented. The example system 100 includes a computing device 102, which may be any one or combination of a fixed or mobile device, in any form of a consumer, computer, portable, communication, navigation, media playback, entertainment, gaming, tablet, display, and/or electronic device. For example, the computing device 102 can be implemented as a touch-screen display device 104, such as an all-in-one computing device or surface table computing device that includes a touch-screen display 106. The touch-screen display device may be configurable in multiple display orientations, such as in an upright, vertical display orientation or in a flat, horizontal display orientation. A touch-screen display device may also be utilized with a computer, television client device, and/or gaming system that is connected to the display device to display media content.

In this example, the touch-screen display device 104 includes capacitive touch controls 108 that are implemented for user selection as a device input to initiate a device action. A capacitive touch control, also referred to as a capacitive button and/or a selectable control, can any type of user-selectable control that initiates a device action when selected by a user, such as a "home" button, a button that launches a software application, a media control button to pause or initiate playback of media content, and/or any type of user interface control.

The computing device 102 may also be any type of portable computing device 110, such as a mobile phone 112 or tablet computer 114 that includes an integrated, touch-screen display 116 and capacitive touch controls 118 that are implemented for user selection as a device input to initiate a device action. The integrated, touch-screen display of a computing device is implemented to sense touch and gesture inputs, such as user-initiated touch and/or selector inputs in a user interface that is displayed on the touch-screen display. In implementations, the computing device 102 includes a touch input module 120 that recognizes touch input sensor data 122, such as a user touch interaction on the touch-screen display. Additionally, any of the computing devices can be implemented with various components, such as one or more processors and memory devices, as well as with any combination of differing components as further described with reference to the example electronic device shown in FIG. 3.

In this example, the computing device 102 includes a lockout service 124 that can be implemented as computer-executable instructions, such as a software application or module that is executed by one or more processors to implement the various embodiments described herein. The computing device 102 also includes capacitive touch controls 126, and the lockout service controls disabling and enabling the capacitive touch controls. In embodiments, the lockout service is implemented to disable one or more of the capacitive touch controls based on user interaction with a touch-screen display of the device.

The lockout service 124 is implemented to receive various service inputs 128, such as from the touch input module 120 that indicates a touch input and/or user interaction with the touch-screen display. The lockout service can also receive other service inputs from components, sensors, and/or software on the computing device. For example, the lockout service can receive the service inputs 128 that indicate user interaction as any one or combination of: a user input 130 to the touch-screen display 116; a user input on the touch-screen display adjacent a capacitive touch control 118; a user slide input direction of approach towards a capacitive touch control; and coordinated multiple user inputs on the touch-screen display.

In embodiments, an array or set of sensors may be implemented around or proximate a capacitive touch control, and the lockout service 124 receives the service inputs 128 as inputs from the array or set of sensors. The lockout service can then distinguish a user selection of a capacitive touch control from a passing swipe over the touch control. For example, if a touch signal is sensed on one side of the capacitive touch control and progressively passes over to the sensors on the other side of the touch control, the lockout service can determine the action as simply a passing swipe over the capacitive touch control, and not a user-selection of the touch control to initiate a device action. Alternatively or in addition, a capacitive level or threshold of a capacitive touch control can be controlled with implementation of an IC that has a specified capacitance threshold before triggering a touch signal so that the IC doesn't respond to a light passing over the touch control.

To avoid an inadvertent actuation of a capacitive touch control 118, such as may be caused by incidental contact 132 on the tablet computer 114, the lockout service 124 can disable the capacitive touch control 118 based on the user interaction (e.g., user input 130) on the touch-screen display 116. In the example of a surface table computing device that includes a touch-screen display and capacitive touch controls, the device and display area is large enough that a first user may be interacting with the display and a second user inadvertently contacts a capacitive touch control causing actuation of an unwanted device action, such as to pause or reset a video game or application that is in use by the first user.

In embodiments, a capacitive touch control (e.g., a capacitive button) can be disabled by the lockout service 124 whenever other interaction is detected on a touch-screen display. For example, a sensor-in-pixel or other display panel can image farther from the surface of a touch-screen display, and a capacitive touch control may be disabled even before a touch input is processed. Additionally, even though a touch input may not be determined exactly or quickly at the touch input module 120, the lockout service can still determine that incidental contact from a user may be extending across a capacitive touch control and onto the touch-screen display.

In other embodiments, the lockout service 124 can implement a time lag before a capacitive touch control is again enabled after having been disabled. The time lag, or time duration, can be based on the location of the user interaction on the touch-screen display and/or based on how long it takes for a typical user to move from the location on the touch-screen display over to the capacitive touch control. This can serve to prevent an inadvertent actuation of the capacitive touch control while the user moves his or her interaction on the touch-screen display to a new position. For example, if the user is interacting with the touch-screen adjacent to a capacitive button, and a finger position was last detected exiting the touch-screen near the capacitive button, the lockout service 124 can initiate a time lag before actuation of the capacitive button to ensure that button actuation was intentional. In implementations, a user interface can be designed to facilitate coordinating the time lag with the lockout service 124. A user interface solution may also include further implementation of the lockout service, or other software, to define the locations of off-screen interactive touch controls so that capacitive touch controls lockout may be tuned dynamically.

In embodiments, the lockout service 124 at a computing device is also implemented to re-enable a capacitive touch control after a duration of time and no additional user interaction with the touch-screen display. The lockout service can also disable a capacitive touch control for a variable duration of time based on a position of user interaction with the touch-screen display and/or disable a capacitive touch control for a duration of time, after which the capacitive touch control is re-enabled without input from the lockout service. The lockout service is also implemented to disable a first capacitive touch control based on a user input to select a second capacitive touch control. For example, a particular selectable control may be disabled by the lockout service so as to avoid initiating an unwanted device action while another selectable control is initiated by a user. The lockout service can also be implemented to receive an override input 134 to re-enable a capacitive touch control that has been disabled, such as when a user selects and holds a capacitive touch control for a duration of time to indicate an intent to initiate the device action that is associated with the particular selectable control.

In other embodiments, the lockout service 124 may initiate active user feedback 136 to indicate that a capacitive touch control has been disabled, such as for easy user recognition that a capacitive touch control is simply disabled, and not malfunctioning. The active user feedback may include altering the visual appearance, shape, color, etc. of a capacitive touch control that has been disabled, or by providing any type of haptic feedback or other indication.

Example method 200 is described with reference to FIG. 2 in accordance with one or more embodiments of capacitive touch controls lockout. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor.

The methods may also be practiced in a distributed computing environment by multiple computer devices. Further, the features described herein are platform-independent and can be implemented on a variety of computing platforms having a variety of processors.

Figure 2:
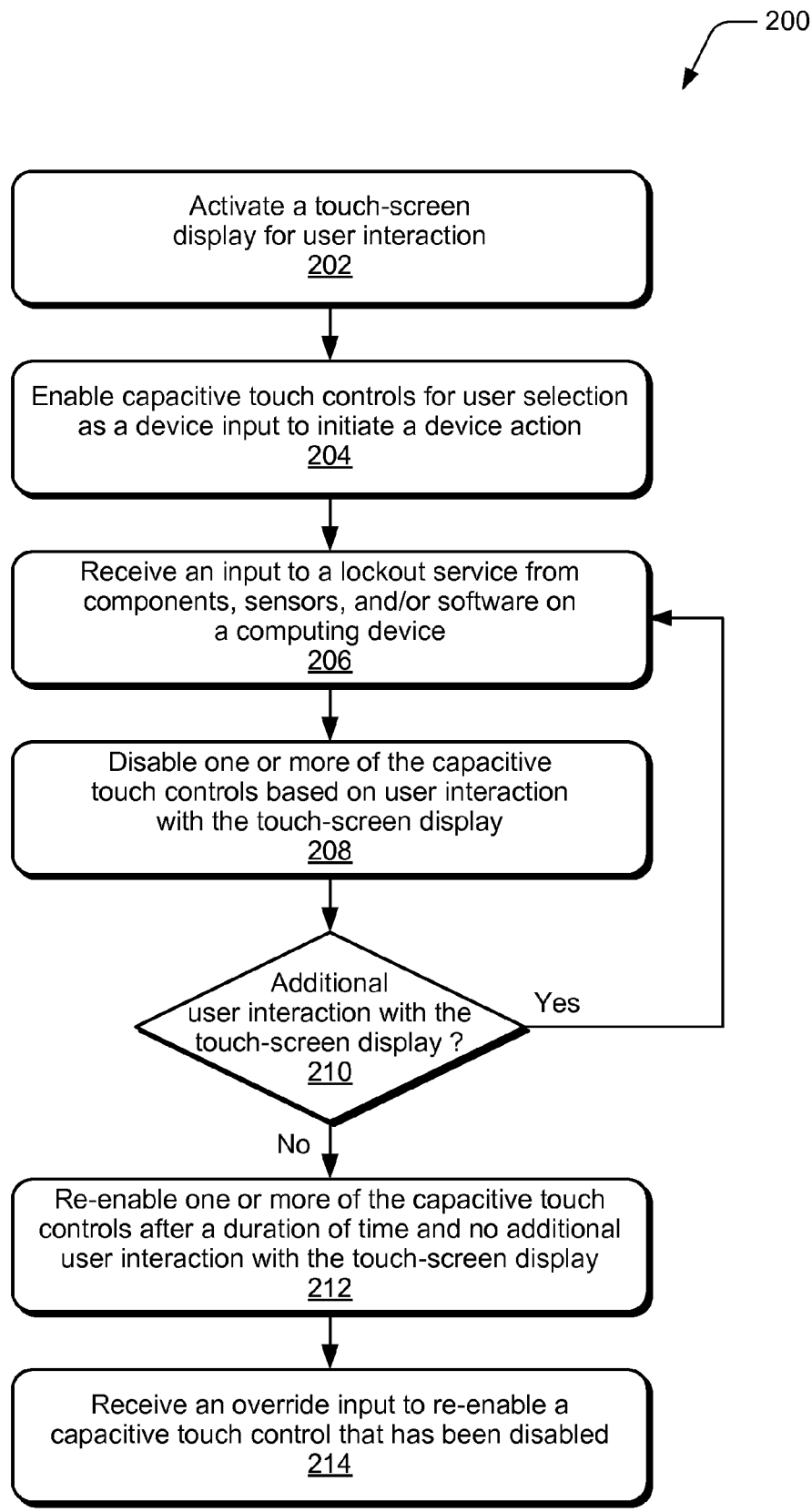
FIG. 2 illustrates example method(s) of capacitive touch controls lockout in accordance with one or more embodiments.

FIG. 2 illustrates example method(s) 200 of capacitive touch controls lockout. The order in which the method blocks are described are not intended to be construed as a limitation, and any number of the described method blocks can be combined in any order to implement a method, or an alternate method.

At block 202, a touch-screen display is activated for user interaction. For example, the computing device 102 (FIG. 1) is representative of the touch-screen display device 104 and also of a portable computing device, such as the tablet computer 114. The touch-screen display device 104 activates the touch-screen display 106 for user interaction, and similarly, the tablet computer 114 activates the touch-screen display 116 for user interaction. The integrated, touch-screen displays of the computing devices are implemented to sense touch and gesture inputs, such as user-initiated touch and/or selector inputs in a user interface that is displayed on a touch-screen display.

At block 204, capacitive touch controls are enabled for user selection as a device input to initiate a device action. For example, the computing device 102 includes capacitive touch controls 126 that are enabled for user selection as a device input to initiate a device action.

At block 206, an input to a lockout service is received from components, sensors, and/or software on the computing device. For example, the lockout service 124 at the computing device 102 receives service inputs 128 that can indicate user interaction with a touch-screen display, such as the touch-screen display 116 of the tablet computer 114. The service inputs can be received as any one or combination of: a user input to the touch-screen display; a user input on the touch-screen display adjacent a capacitive touch control; a user slide input direction of approach towards a capacitive touch control; and coordinated multiple user inputs on the touch-screen display.

At block 208, one or more of the capacitive touch controls are disabled based on user interaction with the touch-screen display. For example, the lockout service 124 at the tablet computer 114 (e.g., a computing device 102) disables the capacitive touch control 118 based on user interaction with the touch-screen display 116. In embodiments, the lockout service can disable a capacitive touch control for a variable duration of time based on a position of the user interaction with the touch-screen display. Additionally, a capacitive touch control can be disabled for a duration of time, after which the capacitive touch control is re-enabled without an activation input. Additionally, a particular capacitive touch control may be disabled based on a user input to select a different capacitive touch control.

At block 210, a determination is made as to whether there is additional user interaction with the touch-screen display. If yes (i.e., "yes" from block 210), then the method continues at blocks 206 and 208 to receive inputs to the lockout service that indicate user interaction with the touch-screen display and to disable one or more of the capacitive touch controls. If no (i.e., "no" from block 210), then at block 212, one or more of the capacitive touch controls are re-enabled after a duration of time and no additional user interaction with the touch-screen display.

At block 214, an override input is received to re-enable a capacitive touch control that has been disabled. For example, the lockout service 124 at the computing device 102 receives an override input 130, such as a held user selection of a capacitive touch control for a duration of time when a user presses and holds a capacitive button to re-enable the button and initiate the intended device action. The method can then continue to re-enable the selected capacitive touch control and initiate the intended device action.

Figure 3:
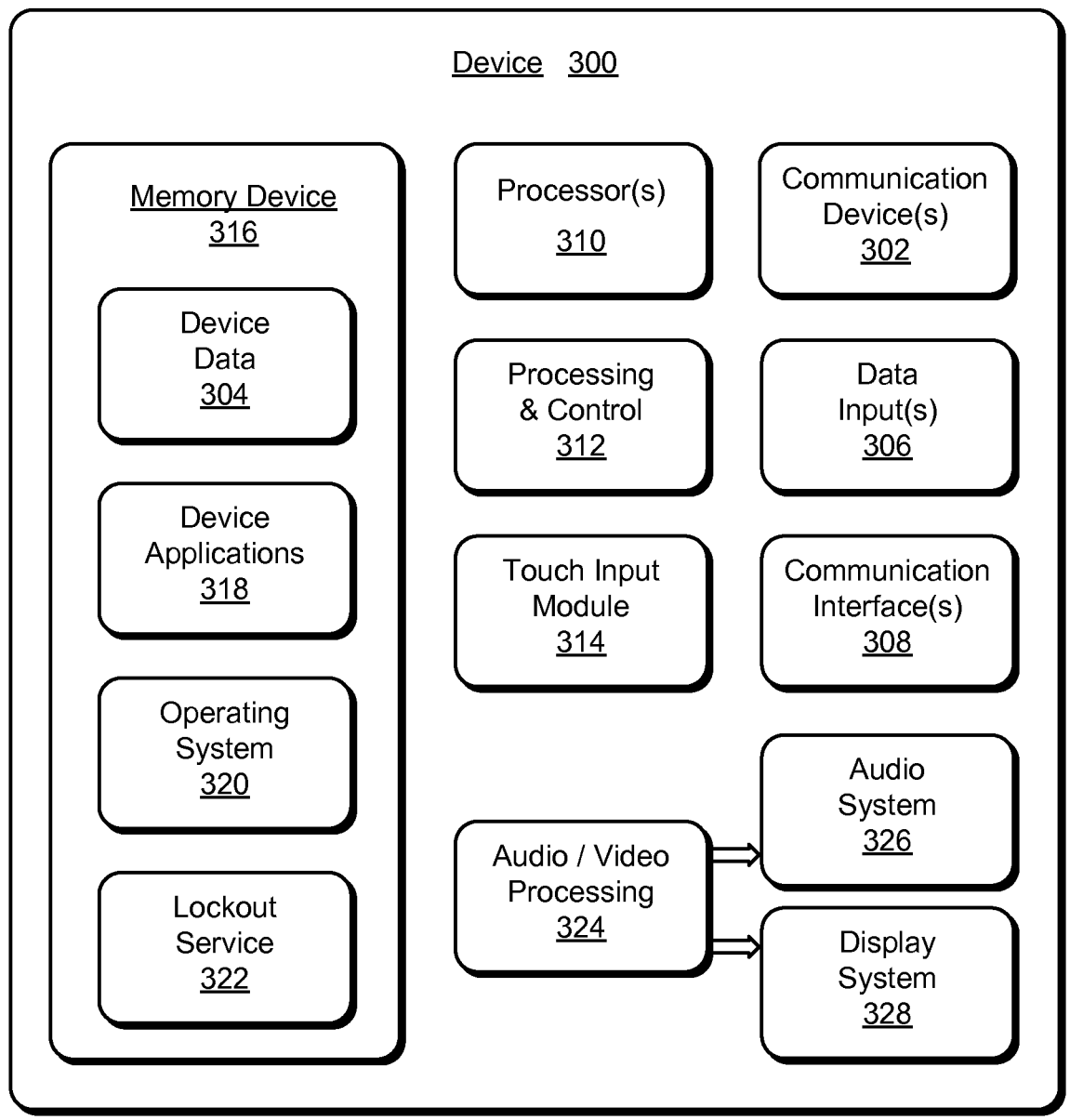
FIG. 3 illustrates various components of an example electronic device in which embodiments of capacitive touch controls lockout can be implemented.

FIG. 3 illustrates various components of an example device 300 that can be implemented as any of the devices, or services implemented by the devices, described with reference to the previous FIGS. 1-2. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 300 includes communication devices 302 that enable wired and/or wireless communication of device data 304, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 306 via which any type of data, media content, and/or inputs can be received, such as user-selectable inputs and any other type of audio, video, and/or image data received from any content and/or data source.

The device 300 also includes communication interfaces 308, such as any one or more of a serial, parallel, network, or wireless interface. The communication interfaces provide a connection and/or communication links between the device and a communication network by which other electronic, computing, and communication devices communicate data with the device.

The device 300 includes one or more processors 310 (e.g., any of microprocessors, controllers, and the like) which process various computer-executable instructions. Alternatively or in addition, the device can be implemented with any one or combination of software, hardware, firmware, or fixed logic circuitry that is implemented in connection with processing and control circuits which are generally identified at 312. In embodiments, the device 300 can also include a touch input module 314 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 300 also includes one or more memory devices 316 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 316 provides data storage mechanisms to store the device data 304, other types of information and/or data, and various device applications 318. For example, an operating system 320 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 318 include a lockout service 322 that implements embodiments of capacitive touch controls lockout as described herein.

The device 300 also includes an audio and/or video processing system 324 that generates audio data for an audio system 326 and/or generates display data for a display system 328, such as an integrated touch-screen display. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are integrated components of the example device. Alternatively, the audio system and/or the display system are external components to the device.

Although embodiments of capacitive touch controls lockout have been described in language specific to features and/or methods, the subject of the appended claims is not necessarily limited to the specific features or methods described. Rather, the specific features and methods are disclosed as example implementations of capacitive touch controls lockout.

The invention claimed is:

1. A computing device, comprising:
a touch-screen display configured for user interaction;
one or more capacitive touch controls configured for user selection as a device input to initiate a device action;
a touch input module configured to receive user inputs to the one or more capacitive touch controls;
a memory and a processor to implement a lockout service that is configured to:
receive various service inputs from the touch input module indicating a touch input and/or user interaction with the touch-screen display;
receive recognition of an inadvertent user contact with a capacitive touch control of the one or more capacitive touch controls;
receive a service input of the inadvertent user contact as a user slide input direction of approach towards the capacitive touch control, the user slide input direction of approach based on a touch signal sensed on a first side of the capacitive touch control and progressively passing over to a second side of the capacitive touch control; and
disable one or more of the capacitive touch controls based on the inadvertent user contact with the capacitive touch control to avoid an inadvertent actuation of the one or more capacitive touch controls.

2. A computing device as recited in claim 1, wherein the lockout service is configured to receive the service input of the user contact with the capacitive touch control.

3. A computing device as recited in claim 1, wherein the lockout service is configured to receive the service input of the inadvertent user contact as a user input on the touch-screen display adjacent to the capacitive touch control.

4. A computing device as recited in claim 1, wherein the lockout service is configured to receive the service input of the user contact as coordinated multiple user inputs on the touch-screen display.

5. A computing device as recited in claim 1, wherein the lockout service is further configured to re-enable one or more of the capacitive touch controls after a duration of time and no additional user interaction with the touch-screen display.

6. A computing device as recited in claim 1, wherein the lockout service is further configured to disable the one or more capacitive touch controls for a variable duration of time based on a position of the user interaction with the touch-screen display.

7. A computing device as recited in claim 1, wherein the lockout service is further configured to disable the one or more capacitive touch controls for a duration of time, after which one or more of the capacitive touch controls re-enable without input from the lockout service.

8. A computing device as recited in claim 1, wherein the lockout service is configured to receive an override input to re-enable the capacitive touch control that has been disabled, the override input received as a held user selection of the capacitive touch control for a duration of time.

9. A computing device as recited in claim 1, wherein the lockout service is further configured to disable a first capacitive touch control based on a user input to select a second capacitive touch control.

10. A computing device as recited in claim 1, wherein the lockout service is further configured to initiate active user feedback to indicate that the capacitive touch control has been disabled.

11. A computer-implemented method, comprising:
activating a touch-screen display for user interaction;
enabling one or more capacitive touch controls for user selection as a device input to initiate a device action;
receiving various service inputs that indicate a touch input and/or user interaction with the touch-screen display;
receiving recognition of an inadvertent user contact with a capacitive touch control of the one or more capacitive touch controls, the inadvertent user contact recognized as a user slide input direction of approach towards the capacitive touch control based on a touch signal sensed on a first side of the capacitive touch control and progressively passing over to a second side of the capacitive touch control;

distinguishing a user input to the capacitive touch control from the inadvertent user contact with the capacitive touch control; and disabling one or more of the capacitive touch controls based on the inadvertent user contact with the capacitive touch control to avoid an inadvertent actuation of the one or more capacitive touch controls.

12. A computer-implemented method as recited in claim 11, further comprising receiving a service input based on at least one of:

the user input to the capacitive touch control;

the user contact on the touch-screen display adjacent to the capacitive touch control;

the inadvertent user contact as a user slide input direction of approach towards the capacitive touch control; or the user contact indicating coordinated multiple user inputs on the touch-screen display.

13. A computer-implemented method as recited in claim 11, further comprising re-enabling one or more of the capacitive touch controls after a duration of time and no additional user contact with the touch-screen display.

14. A computer-implemented method as recited in claim 11, wherein the one or more capacitive touch controls are disabled for a variable duration of time based on a position of the user interaction with the touch-screen display.

15. A computer-implemented method as recited in claim 11, wherein the one or more capacitive touch controls are disabled for a duration of time, after which the one or more capacitive touch controls re-enable without an activation input.

16. A computer-implemented method as recited in claim 11, further comprising receiving an override input to re-enable the capacitive touch control that has been disabled, the override input based on a held user selection of the capacitive touch control for a duration of time.

17. A computer-implemented method as recited in claim 11, wherein a first capacitive touch control is disabled based on a user input to select a second capacitive touch control.

18. A touch controls lockout system, comprising:

one or more capacitive touch controls configured for user selection as a device input to initiate a device action; and a lockout service executable by a processor and configured to:

receive various service inputs that indicate a touch input and/or user interaction with a touch-screen display;

receive recognition of an inadvertent user contact with a capacitive touch control of the one or more capacitive touch controls;

distinguish a user input to the capacitive touch control from the inadvertent user contact with the capacitive touch control; and disable one or more of the capacitive touch controls for a duration of time based on the inadvertent user contact with the capacitive touch control to avoid an inadvertent actuation of the one or more capacitive touch controls, the one or more capacitive touch controls configured to re-enable after the duration of time without an activation input.

19. A touch controls lockout system as recited in claim 18, wherein the lockout service is further configured to receive a service input based on at least one of:

the user input to the capacitive touch control;

the user contact on the touch-screen display adjacent to the capacitive touch control;

the user contact indicating coordinated multiple user inputs on the touch-screen display; or the inadvertent user contact as a user slide input direction of approach towards the capacitive touch control.

* * * * *